June 2, 1959 R. E. SCHWARTZ 2,889,390
METHOD FOR MAKING BATTERY SEPARATOR
Filed May 9, 1955

RALPH E. SCHWARTZ
INVENTOR.
BY

United States Patent Office 2,889,390
Patented June 2, 1959

2,889,390

METHOD FOR MAKING BATTERY SEPARATOR

Ralph E. Schwartz, Fort Lauderdale, Fla., assignor, by mesne assignments, to Hamer H. Jamieson, South Pasadena, Calif.

Application May 9, 1955, Serial No. 506,888

9 Claims. (Cl. 136—148)

My present invention relates to battery separators to be used for separating the elements of wet cell batteries and to methods of making such battery separators, and it relates particularly to a novel battery separator having a substantially uniform electrical resistance over its entire area and to the method of making same.

It is known in the art to produce battery separators from a plurality of substantially globular particles which are adhered together by means of a solvent or otherwise. The usual prior art method of producing battery separators from a plurality of substantially globular particles was to render the surfaces of the particles tacky by means of a solvent and then to form the separators by compressing the mass of particles and solvent in a mold.

The above method of producing battery separators from a plurality of substantially globular particles required the compression of a mass of the particles during the forming process, which caused irregularities in the particle density of the separators because of irregularities in the shape of the mass being compressed. This resulted in a lack of uniformity of the electrical resistance of such prior art battery separators.

These prior art battery separators embodying a plurality of substantially globular particles, usually of polystyrene, normally had a higher electrical resistance per unit of area than is desired for most battery separator purposes. One reason for this detrimentally high electrical resistance per unit of area in these prior art battery separators is that the substantially globular particles embodied in these prior art separators caused a large amount of diversion of the electrical path through these separators. This diversion of the electrical path from a normal path through the battery separators was increased by the relatively large sizes of globular particles used. The globular particles used in these prior art separators were produced by the emulsion process, which resulted in most of the particles being from 20 to 30 mesh particle size, while best results are obtainable from particles much smaller, in the range of from about 70 to about 150 mesh particle size. Attempts to produce battery separators solely from globular particles of such smaller sizes would result in a battery separator which would be too weak because of the relatively small surface contact area between adjacent particles.

In view of the above problems in connection with prior art battery separators composed of a plurality of joined particles, it is an object of my present invention to provide a battery separator and method of making same having a substantially uniform particle density over its entire area, and hence having a substantially uniform electrical resistance over its entire area.

Another object of my present invention is to provide a battery separator composed of a plurality of plastic particles which has a sufficiently low electrical resistance per unit of area to be satisfactory for most wet cell purposes, and to provide a method for producing such a battery separator.

Another object of my present invention is to provide a battery separator composed of a plurality of plastic particles which are sufficiently small in size to provide an electrical resistance per unit of area of the battery separator which is in the desired low range, and to provide a method of making such a battery separator.

A further object of my present invention is to provide a battery separator having a substantially uniform electrical resistance in the desired low range which has the desired strength characteristics for most wet cell purposes, and to provide a method of making such a battery separator.

Other objects and advantages of my present invention will be apparent from the following description and claims, the novelty of my invention consisting in the features of construction, combinations of parts, the novel relations of the members, the relative proportioning, disposition and operation thereof, and the novel method steps, all as is more completely described herein and as is more particularly pointed out in the appended claims.

In the accompanying drawings, forming a part of my present specification:

Figure 1:
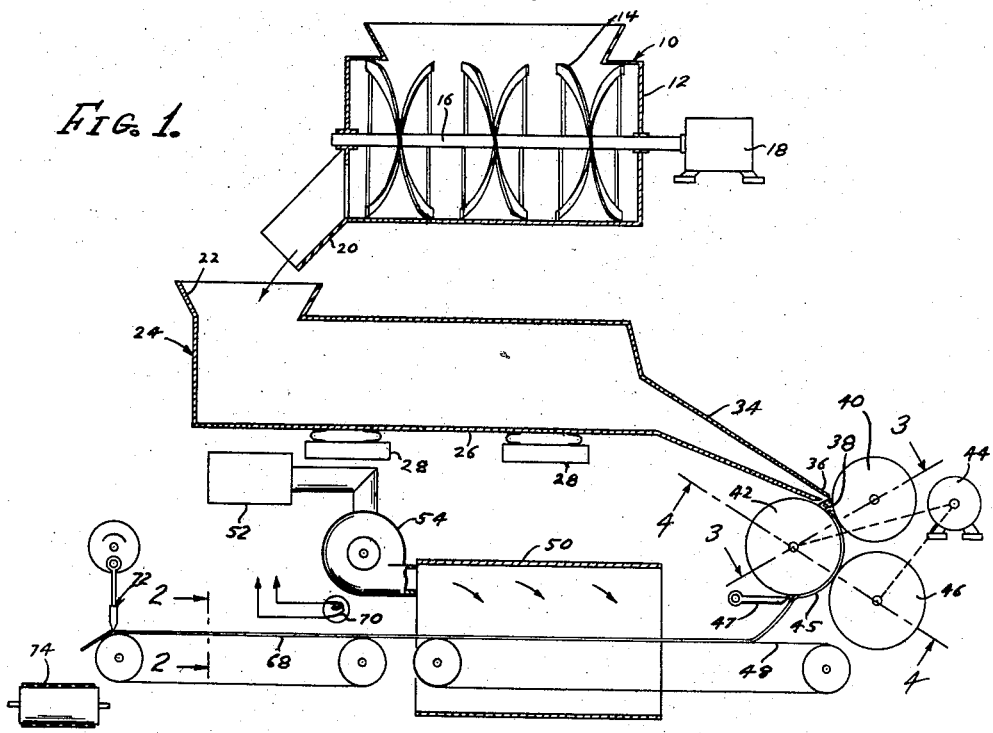
Figure 1 is a schematic elevational view illustrating my preferred apparatus for producing my battery separators.
Figure 2:
Figure 2 is a sectional view of one of my completed battery separators.
Figure 3:
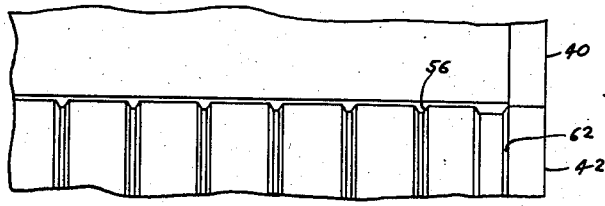
Figure 3 is a fractional section along the line 3—3 in Figure 1.
Figure 4:
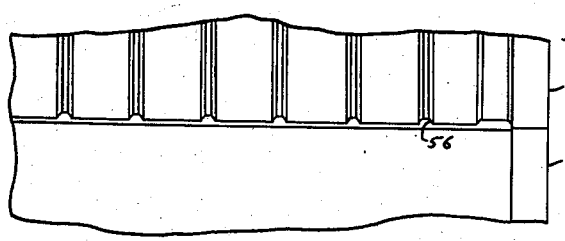
Figure 4 is a fractional section taken along the line 4—4 in Figure 1.

Referring to my drawings, I provide a blender 10 in which a plurality of polystyrene particles are mixed or blended with a solvent which will dissolve surface portions of the particles to permit the particles to be bonded together. Blender 10 may be of any conventional construction, but preferably includes a tank portion 12, a plurality of rotating blades 14 which are mounted on a rotatable shaft 16, and a suitable drive motor 18 operatively connected to the shaft 16.

In order to provide finished battery separators having an electrical resistance of from about .05 to about 2 milliohms per square inch, which is the preferred range for most wet cell uses today, I provide polystyrene particles which are preferably between 70 and 150 mesh particle size, the preferred average being about 100 mesh particle size.

The polystyrene particles which I employ constitute a combination of globules (referred to as "fines" in the industry) and finely ground particles, the preferred combination being from 90% by weight of globules and 10% by weight of the finely ground particles, to 10% by weight of globules and 90% by weight of the finely ground particles. I have found that the best combination comprises approximately 50% of globules and 50% of the finely ground particles.

Although a polystyrene having any molecular weight may be used for my polystyrene particles, I prefer to use a relatively low molecular weight polystyrene having a relatively low density, as I find that this gives the best combination of strength and flexibility to my finished battery separators, and that this is more economical than polystyrenes having higher molecular weights. As the action time of the solvent which is mixed with the polystyrene particles in blender 10 depends upon the molecular weight of the polystyrene used, I prefer to periodically check the molecular weight of the polystyrene in order to properly gage the action time during which the solvent is permitted to operate on the polystyrene particles.

My preferred solvent for softening surface portions of the polystyrene particles is a standard mineral spirits solvent comprising from about 1 to about 3 percent toluene with the remainder an inert carrier liquid. This preferred solvent is a relatively weak solvent which may be used as it is obtained commercially without modification. This preferred solvent is mixed with the polystyrene particles in blender 10 on a preferred basis of 9 parts by weight of polystyrene and one part by weight of the standard mineral spirits solvent, although other relative amounts may be used if desired.

If it is desired, other solvents than toluene may be used, examples of some others, to which the present invention is not necessarily limited, being numerous aromatics such as xylene, heptane, etc., chlorinated solvents such as carbon tetrachloride, and ethylene dichloride, ketones such as acetone, methyl ethyl ketone, methyl isobutyl ketone, hydrocarbon distillates, and solvents such as ethyl acetate.

The combination of polystyrene particles and solvent is blended together in blender 10 until a slush is formed, the blending being gaged in time according to the molecular weight of the polystyrene, the blending time increasing in direct proportion with increases in the molecular weight of the polystyrene. The blending times range from about one minute for the lightest weight polystyrene to about 10 minutes for the heaviest molecular weight polystyrene.

The blending time is also varied according to the degree of bondage desired. Thus, the blending time may be sustained for a longer period than is necessary for a particular molecular weight of polystyrene if added battery separator strength is desired. However, this causes a higher electrical resistance per unit of area of the battery separator.

I prefer to mix a wetting agent such as Aerosol O.T. in with the particles and solvent in a one to two percent amount to insure uniform wetting of the particles by the solvent. Aerosol O.T. is ideal as a wetting agent as it has no detrimental effect on battery action, whereas some other wetting agents do.

Blender 10 continually advances the blended combination of polystyrene particles and solvent to the left in Figure 1 so that this mixture is fed through a suitable conduit 20 into the input opening 22 of a vibrator feed mechanism 24. Vibrator feed mechanism 24 preferably includes a tubular barrel 26 and one or more mechanical vibrators 28.

The mixture of polystyrene particles and solvent is advanced through tubular barrel 26 into the shaper 34 operatively connected to the output end of tubular barrel 26, and the cross-sectional shape of shaper 34 varies from a generally circular or elliptical shape at its connection 35 with tubular barrel 26 to a flat, elongated section at its dispensing end 36.

The cross-sectional area of shaper 34 is preferably substantially the same from its input end 35 to its dispensing end 36, although it may decrease slightly, on the order of about 10%, so that the mixture of polystyrene particles and solvent remains substantially uncompressed during the feeding operation.

This feeding mechanism keeps the mixture of polystyrene particles and solvent under a constant slight pressure, this pressure being so low that substantially no bonding together of the particles occurs in the feeding mechanism. Under these conditions, my preferred bonding solution is so weak that it would take approximately 12 hours to bond the particles together.

This feeding mechanism provides battery separator material 38 which is substantially free from any variations in particle density.

The material 38 is deposited directly between a pair of spaced spreading rolls 40 and 42. Spreading roll 40 is a free-running roll, while roll 42 is power driven clockwise in Figure 1 by means of a suitable motor 44. By thus driving one of the rolls 42 and utilizing a free-running roll 40, the rolls 40 and 42 apply substantially no pressure to the material 38, but merely spread and measure the material 38 so that after the material 38 has passed through rolls 40 and 42 it will be substantially uniform in thickness and density throughout.

The material 38 is deposited directly between the rolls 40 and 42, with very little spacing between the dispensing end 36 of shaper 34 and the rolls 40 and 42 so that material 38 will not deform or break up in any manner between dispensing end 36 and shaper 34 and rolls 40 and 42. Otherwise, particles as fine as the polystyrene particles which I use would tend to form little balls which would ultimately tend to cause dense spots in the finished battery separators.

The ribbon 45 of material formed between rolls 40 and 42, is carried on roll 42 to pass between roll 42 and another adjacent roll 46 which is synchronously power driven with roll 42 in a counterclockwise direction in Figure 1. The ribbon 45 is still carried on roll 42, to be stripped off of roll 42 by stripper 47 onto a conveyor 48.

The surface of roll 42 is preferably highly polished, while the surfaces of rolls 40 and 46 are preferably prepared by first polishing and then disfiguring by abrasion to a slight degree, this latter surface condition also being obtainable by cadmium plating.

The temperature of spreading roll 40 is preferably between 135° F. and 145° F., with a preferred temperature of about 140° F. The preferred temperature range of spreading roll 42 is from 150° F. to 160° F., with the preferred temperature within this range being about 155° F. The preferred temperature range of spreading roll 46 is from 135° F. to 145° F., with the preferred temperature within this range being about 140° F. Within these ranges, the temperature of spreading roll 42 is preferably maintained approximately 15° F. higher than the temperature of spreading rolls 40 and 48. Under these circumstances, I prefer to maintain a tolerance of plus or minus 2° F. on each of the spreading rolls 40, 42 and 46.

By maintaining roll 42 hotter than rolls 40 and 46 the ribbon 45 of battery separator material will be carried on roll 42 until ribbon 45 is stripped off of roll 42 by the stripper 47.

The temperatures of spreading rolls 40, 42 and 46 are maintained as indicated above in order to cause bonding of the polystyrene particles. The length of time the material is subjected to the heat applied by rolls 40, 42 and 46 will determine the degree of bondage between the polystyrene granules, too much heat causing webbing which increases the electrical resistance of the finished separators per unit of area, while too little heat causing insufficient bondage so that the finished battery separators do not have the desired strength characteristics.

Another factor which must be considered in determining the amount of heat to be applied to the ribbon 45 as it passes between rolls 40 and 42, and rolls 42 and 46, is the molecular weight of the polystyrene particles used. The higher the molecular weight of the polystyrene particles, the less heat required to satisfactorily bond the particles together. Since the amount of heat applied to the ribbon 45 by the rolls 40, 42 and 46 also depends upon the surface speed of the rolls, this surface speed is also controlled, between preferred limits of about five feet per minute to about 50 feet per minute, by the speed of motor 44.

Thus, the temperatures of the rolls, the speed of rotation of the rolls, the molecular weight of the polystyrene particles, and also the blending time of the polystyrene particles and solvent, are all coordinated to provide battery separators having the desired strength characteristics, flexibility, electrical resistance per unit of area and uniformity of electrical resistance over the entire area. This substantially uniform electrical resistance will vary within a preferred range of from .05 to 2 milliohms per square inch.

Since the heat applied to ribbon 45 by spreading rolls 40, 42 and 46 speeds up the action of the solvent in ribbon 45, the amount of heat applied must be properly balanced with the amount of solvent. Thus, if more heat is applied, less solvent will be required, while if more solvent is applied, less heat will be required.

Conveyer 48 conveys the ribbon 45 through one or more ovens 50 within which hot air is forced through the porous ribbon 45 and the porous mesh belt of conveyer 48 to vaporize and thereby drive the solvent out of ribbon 45. If desired, one conveyer may be provided to receive the ribbon 45 from rolls 42 and 46, and another conveyer may be provided to pass ribbon 45 through oven 50. The speed of conveyer 48 is synchronized with rolls 42 and 46 so that substantially no stress is applied to ribbon 45.

A suitable means for providing circulating hot air in oven 50 is to utilize a conventional air heater 52 in association with a blower 54 to blow hot air into oven 50.

Ribbon 45 remains in oven 50 sufficiently long to drive off substantially all of the solvent from ribbon 45.

Roll 42 has annular grooves 56 machined thereon to produce ribs 58 on the finished separator 60. Since substantially no pressure is exerted between the cooperating rolls, ribs 58 will have substantially the same particle density as the remainder of the separator 60. Wider grooves 62 at the ends of roll 42 form side ribs 64 at the sides of separator 60.

The ribbon 45 then passes onto another conveyer 68 which moves the ribbon over a suitable light source 70 for inspection in order to eliminate any irregularities in the separators, such as direct enlarged interstices. The observation may be visual, or it may be by photoelectric means of conventional design for determining variations in light intensity.

The finished battery separators 60 are cut off of ribbon 45 at the end of conveyer 68 by a slicer 72 where the finished separators 64 may then be gathered on another conveyer 74.

The ribs 58 are provided in battery separators 60 in order to enhance electrolyte circulation on the positive plate side of the separators. The flat side of the separators without the ribs will retain the material tending to fall off of the negative plates in its operative position.

By thus providing finished separators 60 which have a substantially constant thickness throughout and also a substantially constant particle density throughout (with the exception of side ribs 64), I provide finished battery separators 60 which have a substantially constant electrical resistance per unit of area throughout, thus eliminating high resistance "cold spots" in my separators such as those which are usually found in separators produced by a molding or a calendering process.

My use of a mixture of finely ground polystyrene particles and polystyrene globules for producing my battery separators has several important advantages over the sole use of substantially globular particles heretofore practiced in attempts to produce battery separators by joining a plurality of particles together in a sheet. One such advantage is that the irregularities of my finely ground polystyrene particles cause larger joining surface areas between adjacent particles so that the finished product has greatly improved strength characteristics.

Another advantage of my use of a combination of finely ground polystyrene particles and polystyrene globules instead of just the substantially globular particles heretofore used is that most globular particles previously used, being produced by the emulsion process, are from 20 to 30 mesh particle size, which caused a prohibitively high electrical resistance per unit of area in such battery separators. On the other hand, polystyrene globules or "fines," and the finely ground particles which I use have particle sizes of from between 70 and 150 mesh, which results in battery separators within the preferred resistance range of from about .05 to about 2 milliohms per square inch. Even if substantially globular polystyrene particles within my preferred particle size range were used alone to form battery separators, the joining surface areas between adjacent particles would be so small because of the globular shapes that the resulting separators would not have the required strength characteristics.

Another important advance which my invention makes over the art is the substantially uniform particle density, and hence substantially uniform electrical resistance per unit of area, which I provide in my battery separators. Prior art molding and calendering methods both compressed the battery separator material down to battery separator thickness, the unevennesses in thickness which were present before the compression being transmitted into irregularities in electrical resistance per unit of area. Rather than utilizing such compression, I utilize a plurality of rolls 40, 42 and 46 for spreading and measuring the thickness of the battery separators, but his spreading and measuring operation does not apply substantial pressure to the battery separator material, except at side ribs 64 and hence produces battery separators with substantially uniform particle density, with the only exception being at side ribs 64.

The nature of my finely ground polystyrene particles is such that when they are joined together with my fine globules to form a battery separator, they will cause the electrical path through the separator to be diverted substantially less than the path will be diverted by the exclusive use of globular particles. For this reason, the electrical resistance per unit of area of my battery separators is substantially less than the electrical resistance would be for separators composed entirely of substantially globular particles, even within my particle size range.

My method of producing battery separators has the new elements of utilizing a mixture of both finely ground polystyrene particles and polystyrene globules or "fines," and of eliminating the use of pressure to join the particles together by the use of spreading or measuring rolls. These new method steps include entirely new functions and results as is more fully pointed out above, and produce the surprisingly new results of battery separators having substantially uniform electrical resistance and having an electrical resistance within the desired range. Another surprisingly new result of my present invention is the high rate of battery separator production and the relative cheapness thereof.

It is to be understood that the form of my invention herein shown and described is my preferred embodiment and that various changes in the shape, size, arrangement of parts and method steps may be resorted to without departing from the spirit of my invention, or the scope of my appended claims.

I claim:

1. The method of making a battery separator that includes the steps of providing a fluid mixture of particles of a substantially acid-resistant plastic material and a particle surface softening solvent, and passing said mixture through spaced rolls, at least one of which rolls is heated, and retaining said fluid mixture sufficiently cool to maintain said mixture in fluid form until it reaches substantially the closest point of the rolls to each other, at which point the mixture commences to solidify, and solidifying the mixture completely on one of the rolls after it has passed between the closest point of the rolls to each other, whereby substantially no compression will occur in the mixture.

2. The method of making a battery separator that includes the steps of providing a fluid mixture of particles of a substantially acid-resistant plastic material and a particle surface softening solvent, and passing said mixture through spaced rolls without sufficient pressure being applied to cause distortion of the particles from substantially their initial shapes, at least one of which rolls being heated.

3. The method of claim 2 in which the heat applied to the mixture by the spaced rolls is sufficient to join together said particles so that they will be permanently joined, even after being cooled.

4. The method of claim 2 in which the strength of the finished product and the electrical resistance of the finished product are controlled by controlling the proportion of solvent used.

5. The method of claim 2 in which the remainder of the solvent is driven off after said mixture has passed through said spaced rolls.

6. The method of claim 2 in which said mixture is cut into the correct size for battery separators after it has passed through said spaced rolls.

7. The method of claim 2 in which the remainder of the solvent is driven off after the said mixture has passed through said spaced rolls, and in which said mixture is cut into the correct size for battery separators after said solvent has been so drivein off.

8. The method of claim 2 in which the said plastic material is polystyrene.

9. The method of claim 2 in which the said plastic material is polystyrene, and in which at least ten (10%) percent of the polystyrene particles have substantially irregular surfaces.

References Cited in the file of this patent

UNITED STATES PATENTS

| | | |
|---|---|---|
| 2,297,248 | Rudolph | Sept. 29, 1942 |
| 2,371,868 | Berg et al. | Mar. 20, 1945 |
| 2,374,540 | Hall | Apr. 24, 1945 |
| 2,482,062 | Hanson | Sept. 13, 1949 |
| 2,605,506 | Miller | Aug. 5, 1952 |
| 2,636,851 | Juda et al. | Apr. 28, 1953 |
| 2,662,929 | Dague | Dec. 15, 1953 |
| 2,787,809 | Stastny | Apr. 9, 1957 |

FOREIGN PATENTS

| | | |
|---|---|---|
| 679,514 | Great Britain | Sept. 17, 1952 |
| 737,111 | Great Britain | Sept. 21, 1955 |